UNITED STATES PATENT OFFICE 2,518,012

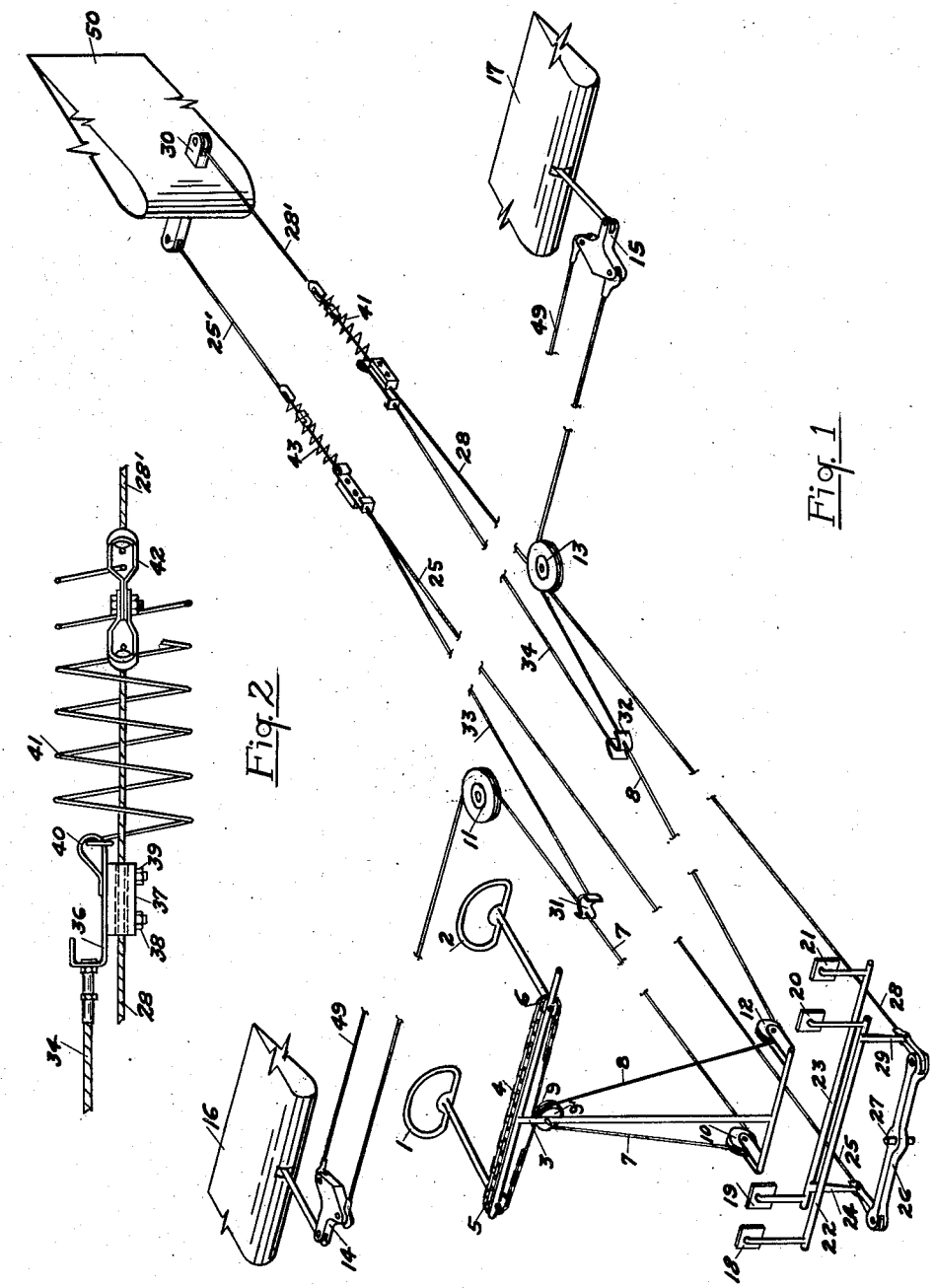

RESILIENTLY INTERCONNECTED AILERON AND RUDDER CONTROL SYSTEM FOR AIRCRAFT

Edward J. Horkey, Rolling Hills, Calif., assignor to North American Aviation, Inc.

Application October 26, 1946, Serial No. 705,907

1 Claim. (Cl. 244—83)

This invention relates to control means for aircraft and particularly to rudder and aileron control means resiliently interconnected so that operation of one affects operation of the other to a desired degree.

Attempts have been made in the past to positively interconnect aileron and rudder controls. Such arrangements have been regarded as unsatisfactory mainly because it prevents independent rudder and aileron control. It is therefore an object of this invention to provide an interconnected rudder and aileron control system which provides the benefits of an interconnected system and yet permits independent rudder and aileron control operation.

It is a further object of this invention to provide aileron and rudder control means which are independently operable and yet are interconnected to the extent that operation of one influences the operation of the other in a predetermined manner.

It is a further object of this invention to provide control means which promotes stability of aircraft in flight and particularly as the same may be influenced by the operation of the rudder or the ailerons.

It is a further object of this invention to provide control means which insures lateral stability and has improved spin recovery characteristics.

It is a further object of this invention to provide a control means which avoids the exercise of excessive or over-control forces.

It is a further object of this invention to provide resiliently interconnected aileron and rudder controls, each control of which, upon release, tends to bring the other to a neutral position, thereby resulting in a quick control-free recovery.

It is still a further object of this invention to provide an interconnected aileron and rudder control system which is particularly effective at critical low speed conditions to stabilize an airplane in various angles of sideslip.

It is yet another object of this invention to provide an interconnected aileron and rudder control system which makes it possible to maneuver the airplane either with the ailerons and elevators alone, or conversely with the rudders and elevators alone.

In the drawing,

Fig. 1 is a diagrammatic arrangement of the invention as applied to an airplane rigged for dual controls, and Fig. 2 is an elevational view of means for interconnecting the aileron and rudder control cables.

Referring to the drawing there is shown a pair of wheels 1 and 2 for dual control. These wheels are rotatably mounted in a conventional manner on a control column and associated structure referred to generally as 3. The wheels are positively interconnected by means of a chain 4 meshing with sprockets 5 and 6 which in turn are rigidly attached respectively to wheels 1 and 2. Attached to the ends of the chain 4 are control cables 7 and 8 which pass over suitable pulleys 9, 10, 11, and 9', 12, 13, respectively to bell cranks 14 and 15 operatively associated in a conventional manner with ailerons 16 and 17. It is to be understood that the control column may be mounted for tilting movement about a horizontal axis in a conventional manner to operate elevator control means. That arrangement is not illustrated since it forms no pertinent part of the present invention.

Operatively associated with the control wheel 1 is a set of rudder control pedals 18 and 19 for use by one pilot. Another set of control pedals 20 and 21 is associated with wheel 2 for use by the other pilot. Pedals 18 and 20 are connected in a conventional manner by rod 22 while pedals 19 and 21 are similarly connected by rod 23. Rod 23 has rigidly attached thereto an arm 24, to the other end of which is connected rudder cable 25. Cable 25 is pivotally attached to an end of link 26 which in turn is mounted for pivotal movement at 27 and has attached at the other end thereof an end of the other rudder control cable 28. Cable 28 in turn is connected to rod 22 by means of an arm 29. Cables 25' and 28' are connected at their opposite ends to an arm 30 rigidly attached to rudder 50 for operating the same.

Rigidly attached at one end to cables 7 and 8 by means of clamps 31 and 32 respectively are interconnecting cables 33 and 34. The other ends of cables 33 and 34 are resiliently attached to rudder control cables 25' and 28' by similar arrangements, one of which is shown in detail in Fig. 2.

Referring to that figure, cable 34 is attached in a suitable manner to a strap 36, connected to a separable block 37 in which cable 28 is freely slidable. Strap 36 is attached to the block and the two parts of the block held in assembled position as shown in Fig. 2 by means of bolts 38 and 39 as illustrated. Strap 36 is provided with a loop 40 to which is attached one end of a spring 41. The other end of the spring is attached to a connector 42 which in turn fastens together the two parts 28 and 28' of the rudder control cable.

It is to be understood that cables 33, 25 and 25' are connected to spring 43 in identically the same manner as cables 34, 28 and 28' respectively are connected to spring 41.

In the operation of the device the aileron and rudder control cables—resiliently interconnected through pre-tensioned springs 41 and 43—are each responsive to the operation of the other. Thus rotation of the control wheel 1 results in tensioning of cable 7 or 8 depending upon whether the rotation is to the right or to the left. Tensioning of cable 7 or 8 in turn operates ailerons 16 and 17 by means of bell cranks 14 and 15 and cable 49 interconnecting these bell cranks in a conventional manner. However, in accordance with the teachings of the invention and particularly by means of cables 33 and 34 and their connections to the rudder control cables, the rudder is caused to move by operation of one or other of the wheels which normally operates the ailerons. The amount of movement may be pre-regulated by selection of springs 41 and 43. Wheel control of the rudder may be neutralized or overcome by independent rudder control action by operation of either of pedals 18 and 19 or 20 and 21. Thus it may be seen that operation of the rudder may correspond with operation of the aileron to a predetermined extent or it may be entirely dependent by operation through the rudder control pedals.

More specifically, operation of the rudder is affected by the aileron control wheel as follows: Rotation of either of the control wheels to the right results in tensioning cable 7, which in turn raises aileron 16 and correspondingly lowers aileron 17 through cables 49 and 8. Tensioning of cable 7 likewise tensions cable 33 and spring 43, which in turn urges rudder 50 to a position of right rudder. The rudder will move in response to the force transmitted through spring 43 unless such force is modified by operation of either of the left rudder pedals 19 or 21. Rotation of either of the control wheels to the left places a tension force on cable 8 to raise aileron 17 and lower aileron 16 and also move rudder 50 to the left through application of tension to cable 34 and spring 41. The force exerted through spring 41 may likewise be modified by operation of either of the right rudder pedals 18 or 20. It is to be understood, of course, that the force on either spring 41 or 43 may be augmented by suitable operation of the rudder pedals if such action is desired.

Operation of the ailerons also is affected by operation of the rudder pedals in the following manner: Pressure on either of the right rudder pedals 18 or 20 results in tensioning of cable 25 to move rudder 50 to the right. This will in turn exert a force through lever 30, cable 28', spring 41, and cable 34 to exert a tensile force through cable 8 and the control wheel mechanism to cable 7 and bell crank 14 to raise aileron 16 and through cable 49 and bell crank 15 to lower aileron 17. In a similar manner, pressure on either of the left rudder pedals will transmit a tensile force to spring 43 which in turn is transmitted through cables 33 and 7 to cable 7 and bell crank 15 for raising aileron 17 and lowering aileron 16. The effect of either of springs 41 or 43 upon the aileron may of course be counteracted by proper operation of either of the control wheels.

Interconnection of the aileron and rudder control mechanism provides in effect a single control and in normal operations the controls tend at all times to return the plane to a state of equilibrium. However, in the event of unusual circumstances the pilot may nevertheless effect any desired manipulation of the controls. In the normal operation of the device, pressure on the right rudder causes the nose to swing to the right. To obtain a side-slip condition with the plane maintaining its normal direction it is necessary to apply the ailerons in such a manner as to depress the left wing which, in the condition of present side-slip, is the leading wing.

Prior to this invention it has been possible to obtain this condition with a force so slight that the pilot could not judge its amount. This has resulted in many instances in poor control of the airplane. However, following the teaching of the invention, it has been found that the force applied by the interconnect spring results in obtaining this condition and at the same time effect a force on the controls to obtain what is commonly referred to as "pilot feel" whereby a condition of lateral stability is indicated to the pilot. When the right rudder is depressed in the maneuver it is to be understood of course that the wheel tends to rotate to the right and to overcome the force exerted from the spring 41 it is necessary to rotate the wheel to the left. This is the essence of stability in that a definite force must be exerted by the pilot to change the heading, bank angle, or altitude of the airplane.

Recovery from a side-slip condition is obtained by merely relaxing the force exerted on the wheel and rudder to allow the controls to return to normal position. The airplane thereupon returns to a level flat condition, stable and in equilibrium.

In the event of a spin, recovery may be effected as follows: If the spin is to the right the rudder tends to trail off to the right because of the direction of the rotation of the spin. In recovering, the pilot returns the rudder either to neutral or to the full opposite position which, in the present situation, would be full left rudder. With the interconnecting system, according to the teaching of this invention, the ailerons tend to float either to neutral or at such position as to return the rudder automatically to neutral or to some position of left deflection. With the usual separate controls the pilot normally performs four consecutive or simultaneous steps with the rudder and aileron controls to come out of a spin, while with the present resilient interconnection the same result may be accomplished with either the rudder or the wheel in two steps.

It is readily understood that the present interconnecting controls permit design of an airplane for improved high speed lateral stability. In the usual situation, increasing the dihedral to obtain better stability is satisfactory for low speeds, but at high speeds such design interferes with the maneuverability of the plane. The present arrangement obtains the advantage of high speed maneuverability while retaining stability at low speeds, particularly with flaps down and power on, as in the normal landing operation.

Thus it is seen that the interconnection of the aileron and rudder control systems which automatically induces movement in one system upon operation of the other, permits flying the ship in normal flight simply by operating either the wheel or the rudder controls, the control force not positively operated following automatically.

It is to be understood that the showing in Fig. 1 is diagrammatic and that parts such as control wheels, rudder pedals, ailerons, rudder, pulleys, and the like, are suitably supported in accordance with conventional design, these not being illustrated since they do not form a part of the present invention.

Although the invention has been described and illustrated in detail, it is to be clearly understood that the same is by way of illustration and example only and is not to be taken by way of limitation, the spirit and scope of this invention being limited only by the terms of the appended claim.

I claim:

In an aircraft having ailerons and a rudder, means for operating said ailerons including a wheel and cable means operatively connecting said wheel to said ailerons, means for independently operating said rudder including pedals and cables operatively connecting said pedals to said rudder, and means directly resiliently interconnecting said rudder and aileron cables to effect a desired movement of the rudder upon movement of the aileron control means or a desired movement of the ailerons upon operation of the rudder control means; said interconnecting means comprising clip means attached to said aileron cables, a spring positively attached at one end to each of said rudder cables, a guideway member slidably mounted on each of said rudder cables to which the other end of each of said springs is attached, and interconnecting cables attached at one end to each of said clip means and at the other end of each of said guideway members.

EDWARD J. HORKEY.

REFERENCES CITED

The following references are of record in the file of this patent:

UNITED STATES PATENTS

| Number | Name | Date |
|---|---|---|
| 2,196,385 | De Florez et al. | Apr. 9, 1940 |
| 2,318,833 | Stambach | May 11, 1943 |
| 2,340,237 | Upson | Jan. 25, 1944 |

FOREIGN PATENTS

| Number | Country | Date |
|---|---|---|
| 323,881 | Germany | Aug. 11, 1920 |